US012695254B2

(12) United States Patent
Su et al.

(10) Patent No.: US 12,695,254 B2
(45) Date of Patent: Jul. 28, 2026

(54) WIRELESS SIGNAL EXTENDER

(71) Applicant: PLUME DESIGN, INC., Palo Alto, CA (US)

(72) Inventors: Ming-Tsung Su, Taipei City (TW); Chun-Wen Wang, Taoyuan City (TW)

(73) Assignee: PLUME DESIGN, INC., Palo Alto, CA (US)

(*) Notice: Subject to any disclaimer, the term of this patent is extended or adjusted under 35 U.S.C. 154(b) by 281 days.

(21) Appl. No.: 18/488,149

(22) Filed: Oct. 17, 2023

(65) Prior Publication Data

US 2025/0125567 A1 Apr. 17, 2025

(51) Int. Cl.
*H01R 24/28* (2011.01)
*H01R 13/405* (2006.01)
*H01R 43/20* (2006.01)

(52) U.S. Cl.
CPC ........... *H01R 24/28* (2013.01); *H01R 13/405* (2013.01); *H01R 43/20* (2013.01)

(58) Field of Classification Search
CPC ...................................................... H01R 24/28
See application file for complete search history.

(56) References Cited

U.S. PATENT DOCUMENTS 2,226,148 A * 12/1940 Taylor .................. H01R 13/453 439/682
3,543,218 A * 11/1970 Archer ................... H01R 13/20 439/923
3,710,287 A * 1/1973 Eckert .................... H01R 13/44 439/693
5,641,311 A * 6/1997 Chuang .................. H01R 13/44 439/693
5,897,398 A * 4/1999 Maeda ................... H01R 13/44 439/693
6,527,596 B1 * 3/2003 Su .......................... H01R 13/04 439/693
6,846,203 B1 * 1/2005 Su ........................ H01R 13/521 439/693
6,981,896 B2 * 1/2006 Su .......................... H01R 43/24 439/693

* cited by examiner

*Primary Examiner* — Neil Abrams
(74) *Attorney, Agent, or Firm* — Nicholas Martin; Greenberg Traurig, LLP

(57) ABSTRACT

Electrical plugs may include a first conductive pin and a second conductive pin extending from a base structure. A first insulating sleeve may surround a first base portion of the first pin and a second insulating sleeve may surround a second base portion of the second pin. Each of the first insulating sleeve and the second insulating sleeve may have a wall thickness of between about 0.10 mm and about 0.30 mm. Various other related devices, systems, and methods are also disclosed.

20 Claims, 5 Drawing Sheets

WIRELESS SIGNAL EXTENDER

Figure 1:
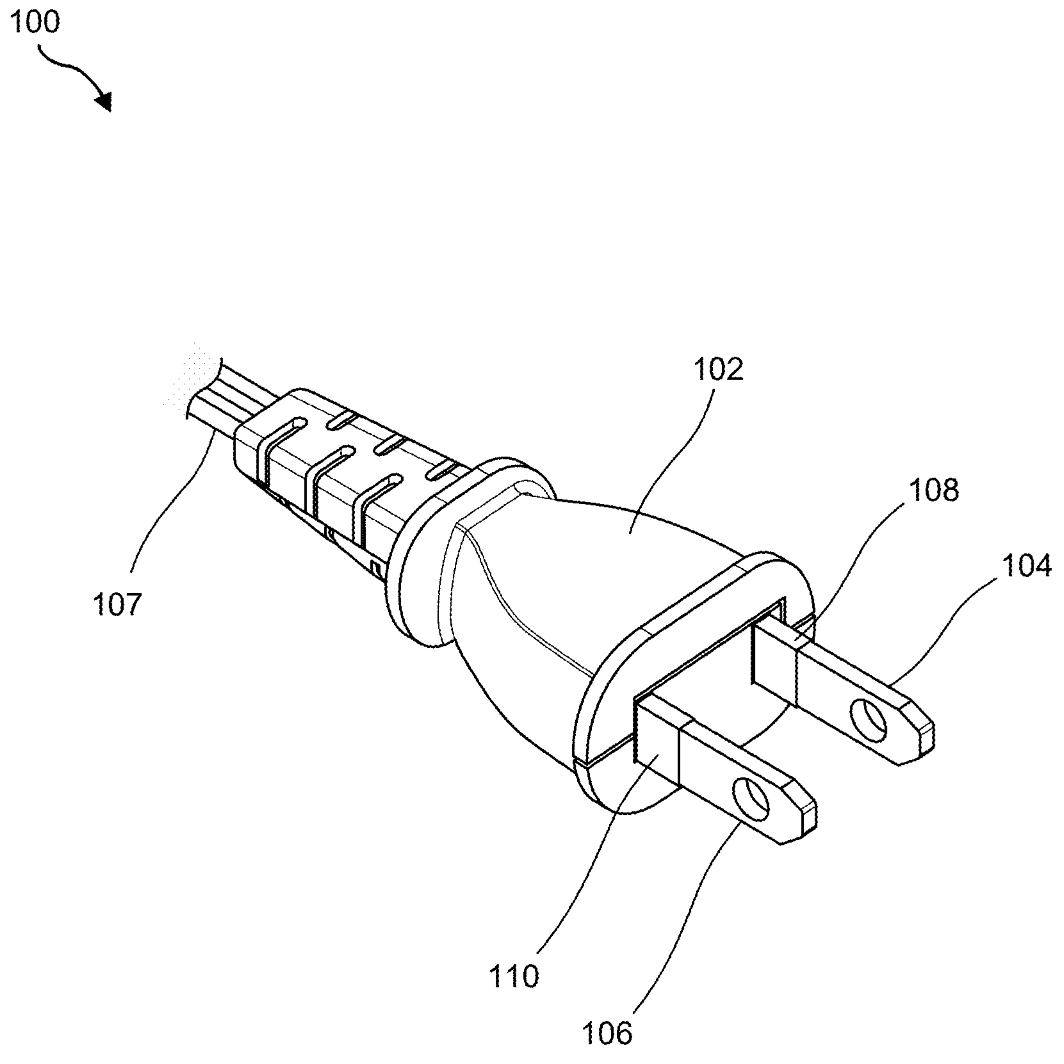
FIG. 1 is a perspective view of an electrical plug, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Electrical outlets and corresponding plugs are used to provide power to many electrical devices. For instance, in the U.S. and Japan, two-pronged or three-pronged plugs are commonly used. The two prongs (also referred to as "pins") that provide the power to the device are usually the neutral pin and the live pin. If a third prong is used, it can be the ground pin for connecting the device to an electrical ground.

If a plug is powered, such as by partial insertion into an outlet, there can be a risk of electrical shock when a base of the neutral and live pins are touched by a finger or electrically conductive item (e.g., a paperclip, a pin, a wire, etc.). Additionally, the pins of plugs can sometimes be susceptible to bending or other mechanical deformation or failure.

The present disclosure provides detailed descriptions of electrical plugs including one or more insulated pins. As will be explained in greater detail below, embodiments of the present disclosure may include a base structure and two conductive pins extending from the base structure. Base portions of the conductive pins may be surrounded by insulating sleeves. Each of the insulating sleeves may have a wall thickness between about 0.10 mm and about 0.30 mm, such as about 0.25 mm. The insulating sleeves having this small thickness can be configured to maintain electrically insulating properties to inhibit (e.g., reduce or eliminate) a risk of shock through the insulating sleeves, while enabling the underlying pin to have a thickness that results in suitable mechanical strength and stability to reduce a likelihood of bending.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 is a perspective view of an electrical plug 100, according to at least one embodiment of the present disclosure. The electrical plug 100 may include a base structure 102, a first conductive pin 104 extending from the base structure 102, and a second conductive pin 106 extending from the base structure 102. The base structure 102 may be formed of an insulating material, such as a polymer material. The base structure 102 may mount the first and second conductive pins 104, 106 to a conductive cable 107, such as to provide power to an associated electrical device.

The first and second conductive pins 104, 106 may be formed of a conductive metal material, such as a stainless-steel material. In one example, the material of the first and second conductive pins 104, 106 may be a so-called "SUS304-1H" stainless-steel material, which may exhibit good strength (e.g., including an HV hardness of about 370-420 in some implementations) to withstand impact from a drop event and which may also exhibit good corrosion resistance. The first and second conductive pins 104, 106 may be, respectively, a live or hot pin and a neutral pin. The first and second conductive pins 104, 106 may be polarized or non-polarized. In some implementations, in addition to the first and second conductive pins 104, 106, a ground pin may also extend from the base structure 102.

The first and second conductive pins 104, 106 may be partially insulated. For example, base portions of the first and second conductive pins 104, 106 adjacent to the base structure 102 may be surrounded by a first insulating sleeve 108 and a second insulating sleeve 110, respectively. The first and second insulating sleeves 108, 110 may improve a safety of the electrical plug 100, such as to reduce a risk of electrical shock from touching the base portions of the first and second conductive pins 104, 106, such as with a finger and/or with a conductive wire, pin, coin, tool, or the like. As used herein, the term "insulating" may generally refer to electrically insulating.

The base portions of the first and second conductive pins 104, 106 may have a reduced thickness (e.g., compared to exposed portions of the first and second conductive pins 104, 106) to allow space for material of the first and second insulating sleeves 108, 110, while still enabling the first and second insulating sleeves 108, 110 to fit within a corresponding plug receptacle. A length of the reduced-thickness base portion may be sufficient to accommodate the first and second insulating sleeves 108, 110, but little or no longer so that a rigidity of the first and second conductive pins 104, 106 may be maintained. For example, the reduced-thickness base portion may have a base length of about 5.0 mm or less, such as about 4.8 mm. In some embodiments, a section of the base portion may be within the base structure 102.

In some examples, terms such as "substantially" or "about," in reference to a given parameter, property, or condition, may refer to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or fully met.

The first and second insulating sleeves 108, 110 may be formed of an insulating material that is mechanically stable and insulating at a low wall thickness, such as to enable the base portions of the first and second conductive pins 104, 106 to have a high thickness for improved mechanical strength. By way of example, and as explained further below, the first and second insulating sleeves 108, 110 may have a wall thickness of between about 0.10 mm and about 0.30 mm, such as about 0.25 mm. The material of the first and second insulating sleeves 108, 110 may be, for example, a fiber-polymer composite material, such as a polymer matrix and a fiber material reinforcement. In some embodiments, the fiber-polymer composite material may be or include a polyamide matrix material and glass fiber reinforcement material in an amount of about 30% weight value, such as a so-called "PA66 GF30" material, which may exhibit a high heat resistance and high rigidity to inhibit deformation.

The electrical plug 100 is illustrated in FIG. 1 as a Type A plug, which is commonly used in certain regions including the United States, Canada, Central America, and Japan. However, the present disclosure is not so limited. In additional examples, the present disclosure can be implemented in conjunction with any type of electrical plug (e.g., any of standard Types A-O or a non-standard power supply plug).

Figure 2:
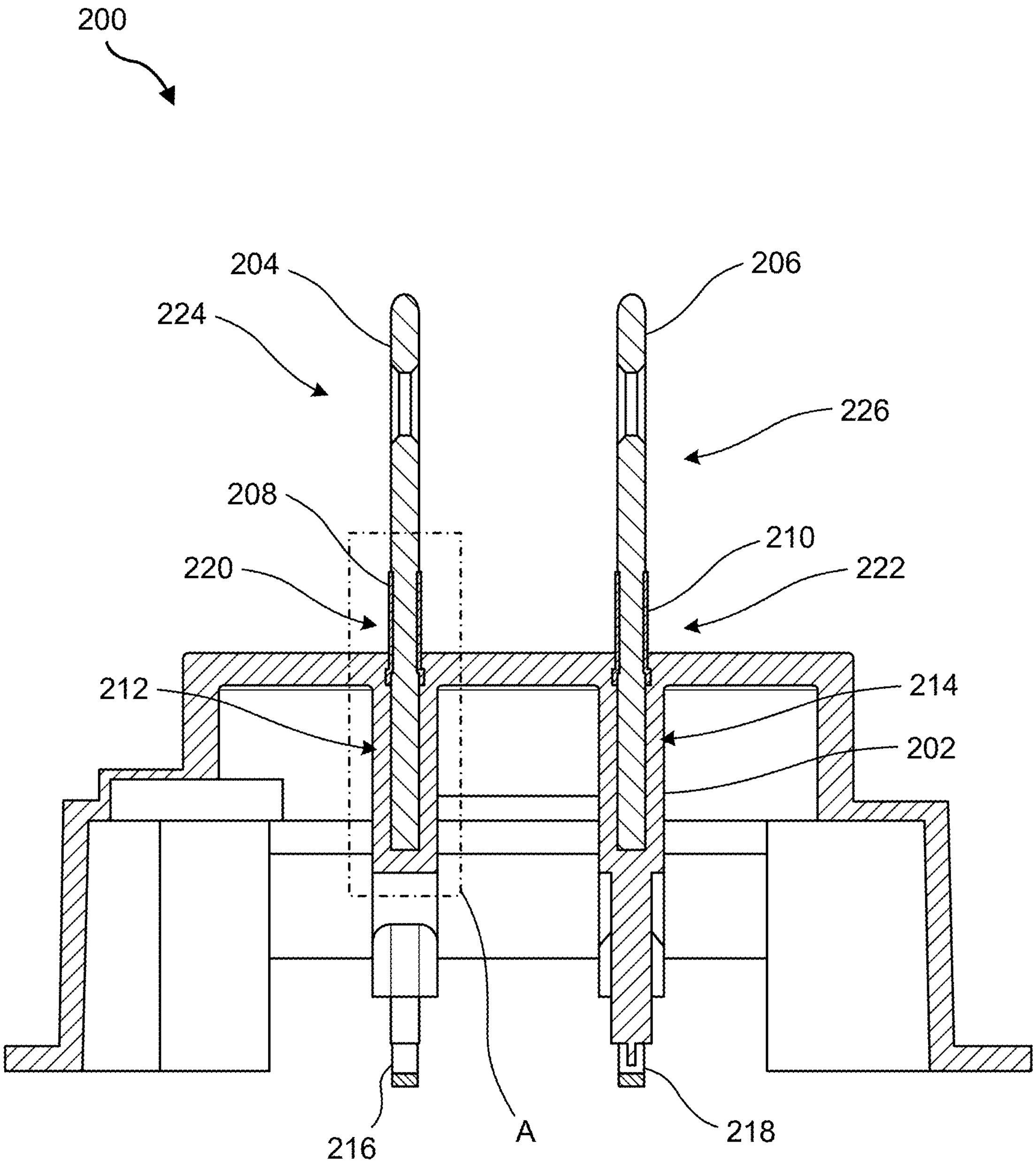
FIG. 2 is a cross-sectional side view of an electrical plug, according to at least one further embodiment of the present disclosure.
Figure 3:
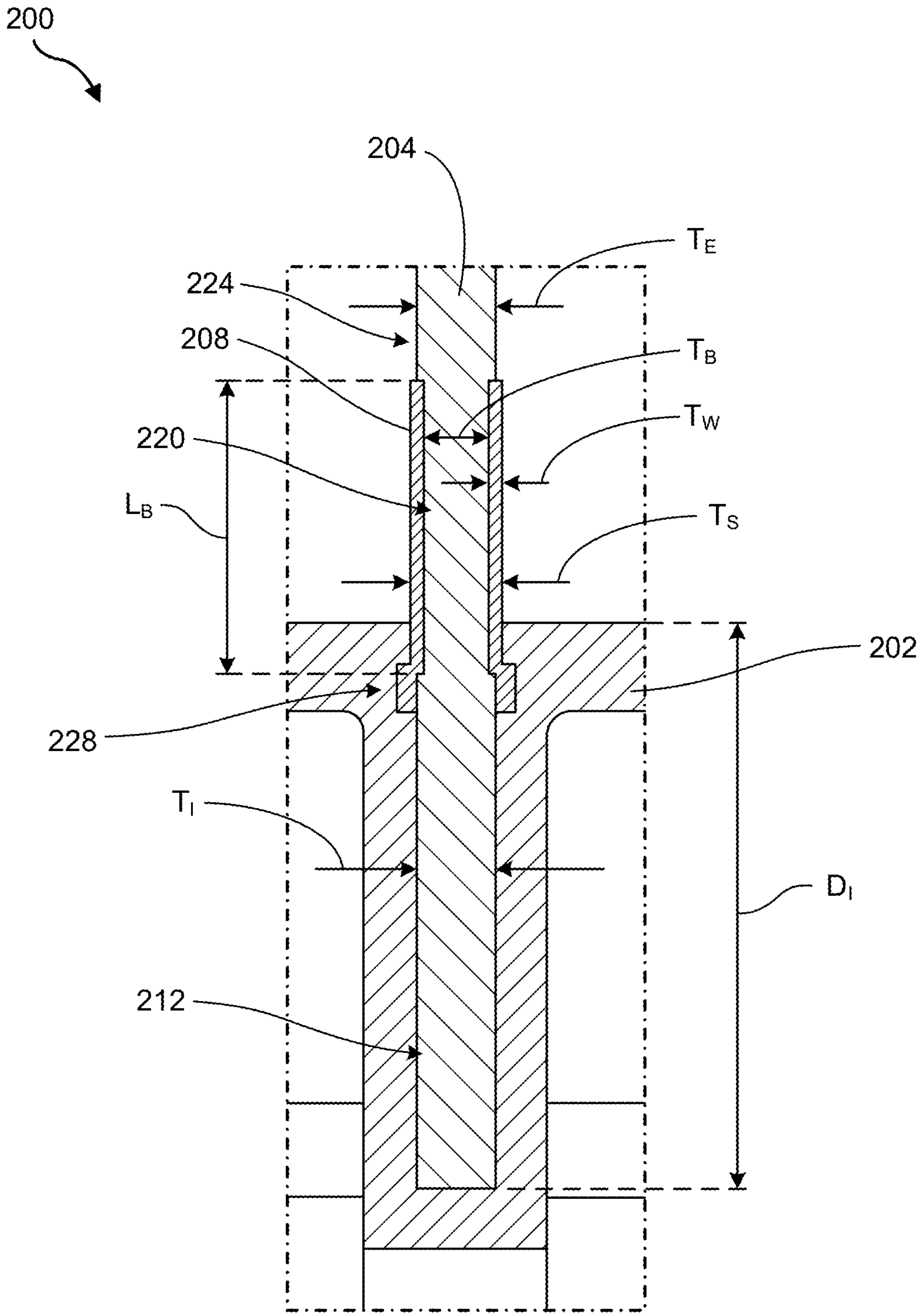
FIG. 3 is a detailed cross-sectional side view of the electrical plug of FIG. 2, taken at dash-dot square A of FIG. 2.

FIG. 2 is a cross-sectional side view of an electrical plug 200, according to at least one further embodiment of the present disclosure. FIG. 3 is a detailed cross-sectional side view of the electrical plug 200 of FIG. 2, taken at dash-dot square A of FIG. 2.

As illustrated in FIG. 2, the electrical plug 200 may include a base structure 202, a first conductive pin 204 extending from the base structure 202, and a second conductive pin 206 extending from the base structure 202. The base structure 202 may be formed of an insulating material, such as a polymer material.

The first conductive pin 204 may include a first insert portion 212 positioned within the base structure 202. Likewise, the second conductive pin 206 may include a second insert portion 214 positioned within the base structure 202. The first insert portion 212 and the second insert portion 214 may be electrically coupled to first and second leads 216, 218, respectively, such as for providing power to an electrical device. In some examples, the base structure 202 may be a housing of an electrical device that is configured to be plugged directly into an outlet (e.g., a wall outlet, a power strip, etc.). In additional examples, the base structure 202 may mount the first and second conductive pins 204, 206 to a conductive cable.

The first conductive pin 204 may include a first base portion 220 adjacent to and extending away from the base structure 202. Similarly, the second conductive pin 206 may include a second base portion 222 adjacent to and extending away from the base structure 202. In some examples, a section of the first and second base portions 220, 222 may be within (e.g., below an outer surface of) the base structure 202. A first insulating sleeve 208 may surround the first base portion 220 of the first conductive pin 204 and a second insulating sleeve 210 may surround the second base portion 222 of the second conductive pin 206.

The first conductive pin 204 may also include a first exposed portion 224 extending away from the first base portion 220. The second conductive pin 206 may include a second exposed portion 226 extending away from the second base portion 222. The first and second exposed portions 224, 226 may be configured for electrical connection to a power source, such as a power outlet receptacle.

A portion of the first conductive pin 204 and the corresponding base structure 202 are shown in detail in FIG. 3. The following discussion relating to the first conductive pin 204 may also apply to the second conductive pin 206.

As shown in FIG. 3, the first base portion 220 of the first conductive pin 204 may have a smaller base thickness $T_B$ compared to the first exposed portion 224 and/or compared to the first insert portion 212. This smaller base thickness $T_B$ may be configured to accommodate the first insulating sleeve 208, while enabling the first insulating sleeve 208 to fit within a standard outlet receptacle. In addition, the base thickness $T_B$ may have a thickness that is large enough to maintain mechanical stability of the first conductive pin 204. For example, the base thickness $T_B$ may be at least about 1.20 mm, such as about 1.30 mm. An exposed thickness $T_E$ of the first exposed portion 224 may be between about 1.40 mm and about 1.60 mm, such as about 1.50 mm. In some embodiments, an insert thickness $T_I$ of the first insert portion 212 may be at least the same size as the exposed thickness $T_E$. In other words, the insert thickness $T_I$ may be the same as or larger than the exposed thickness $T_E$. The base thickness $T_B$ may be less than the exposed thickness $T_E$ and/or less than the insert thickness $T_I$.

A wall thickness $T_W$ of the first insulating sleeve 208 may be between about 0.10 mm and about 0.30 mm, such as about 0.25 mm. This wall thickness $T_W$ may enable the first insulating sleeve 208 to have insulating properties, such as to inhibit an electrical shock through the first insulating sleeve 208, while being sufficiently small to allow the base thickness $T_B$ of the first base portion 220 of the first conductive pin 204 to be large enough to increase a mechanical stability of the first base portion 220 (e.g., to reduce a risk of bending of the first conductive pin 204 at the first base portion 220). A sleeve thickness $T_S$ across the first insulating sleeve 208 may be selected to fit within a standard outlet receptacle. For example, the sleeve thickness $T_S$ may be less than or equal to about 1.85 mm.

As shown in FIG. 3, the first insulating sleeve 208 may include a support portion 228 positioned within the base structure 202. By way of example, the support portion 228 may be or include a flange extending laterally outward. The flange may define a lip, which can help maintain the first insulating sleeve 208, and consequently the first conductive pin 204, in engagement with the base structure 202.

An insert depth $D_I$ of the portion of the first conductive pin 204 within the base structure 202 (e.g., below an outer surface of the base structure 202) may include at least the entire first insert portion 212. As illustrated in FIG. 3, in some implementations, the insert depth $D_I$ may also include a section of the first base portion 220 of the first conductive pin 204. In some examples, the insert depth $D_I$ may be at least about 9.0 mm (e.g., 10.0 mm, 12.0 mm, 15.0 mm, etc.), such as to provide a stable and robust mechanical support for the first conductive pin 204.

A base length $L_B$ of the first base portion 220 of the first conductive pin 204 may be about 5.0 mm or less, such as about 4.8 mm. This base length $L_B$ enables the first insulating sleeve 208 to be sufficiently long to reduce a risk of electric shock, while maintaining a short length of the first base portion 220 with the narrower base thickness $T_B$ (e.g., compared to the exposed thickness $T_E$ and support thickness $T_S$) to increase a mechanical strength of the first conductive pin 204.

Accordingly, the first and second conductive pins 204, 206 may be configured (e.g., dimensioned, structured, etc.) to provide additional safety and reduced shock risk while maintaining increased mechanical and structural strength and stability.

Figure 4:
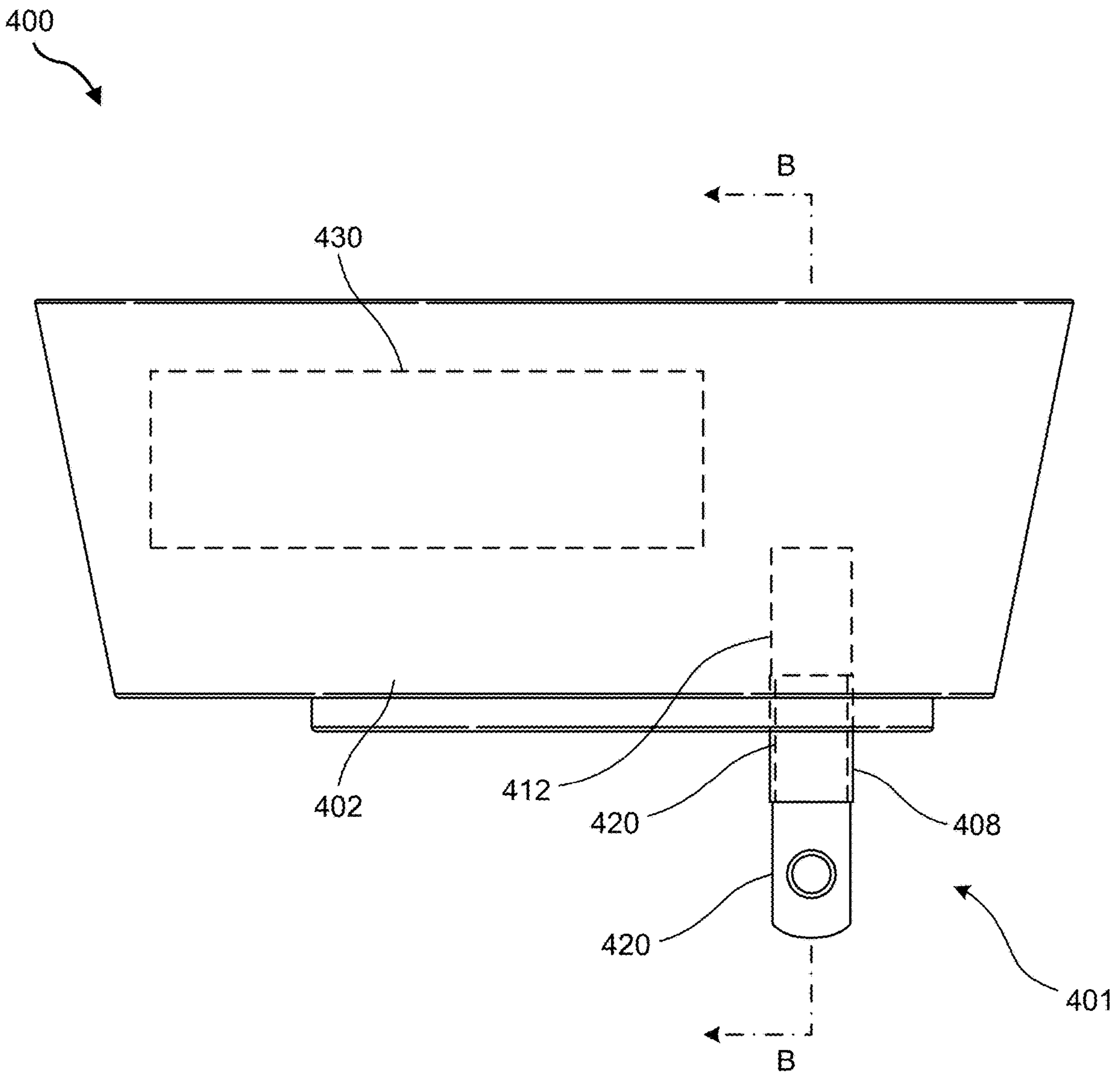
FIG. 4 is a side view of an electrical device including an electrical plug, according to at least one embodiment of the present disclosure.

FIG. 4 is a side view of an electrical device 400 including an electrical plug 401, according to at least one embodiment of the present disclosure. The cross-sectional side views of FIGS. 2 and 3 may correspond to a view through line B-B of FIG. 4.

In some respects, the electrical plug 401 may be similar to the electrical plug 100 of FIG. 1 and the electrical plug 200 of FIGS. 2 and 3. For example, the electrical plug 401 may include a conductive pin 404 mounted to and extending from a base structure 402. The conductive pin 404 may include an insert portion 412 within the base structure 402, a base portion 420 adjacent to and extending from the base structure 402, and an exposed portion 424 extending from the base portion 420. An insulating sleeve 408 may surround the conductive pin at the base portion 420. The base portion 420 of the conductive pin 404 under the insulating sleeve 408 may have a narrower thickness than the exposed portion 424 to provide space for the insulating sleeve 408.

As illustrated in the example of FIG. 4, the base structure 402 may be a housing of the electrical device 400. Thus, the electrical plug 401 may extend directly from the housing of the electrical device 400 to mount the electrical device 400 directly to an outlet (e.g., a wall outlet, a power strip outlet, etc.), without the use of a conductive cable connecting the electrical plug 401 to the electrical device 400.

The electrical device 400 may also include at least one electrically powered element 430, which may be powered by the electrical plug 401 (e.g., when the electrical plug 401 is mated with a power source, such as an outlet receptacle). The electrically powered element 430 may include any type of electrically powered element 430, such as a microprocessor, memory, a wireless transceiver, a display element, a sound transducer, a fan, a heating element, a power converter, a battery, any combination thereof, or any other electrically powered element.

Figure 5:
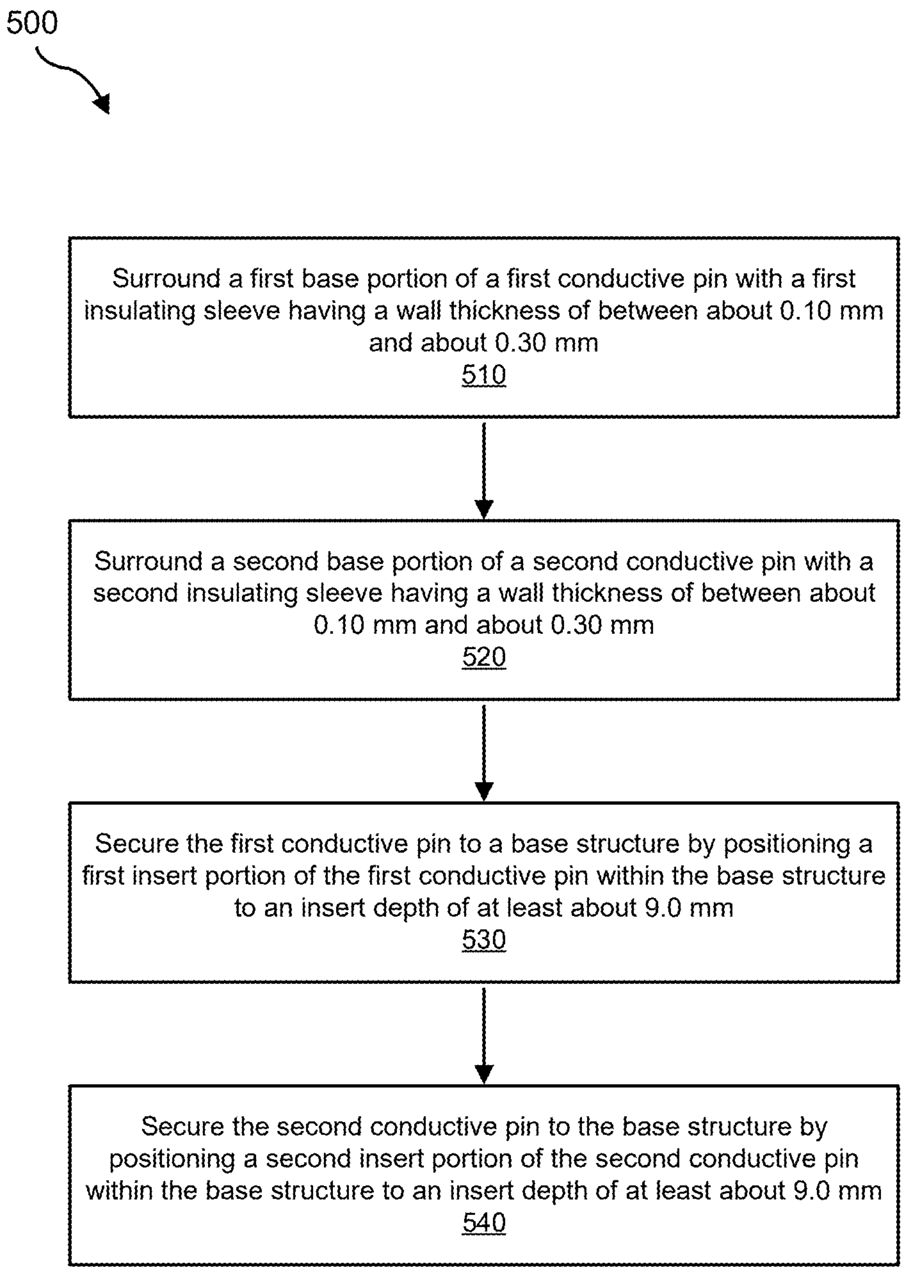
FIG. 5 is a flow diagram illustrating a method of fabricating an electrical plug of an electrical device, according to at least one embodiment of the present disclosure.

FIG. 5 is a flow diagram illustrating a method 500 of fabricating an electrical plug of an electrical device, according to at least one embodiment of the present disclosure. At operation 510, a first base portion of a first conductive pin may be surrounded with a first insulating sleeve having a wall thickness of between about 0.10 mm and about 0.30 mm, such as about 0.25 mm. At operation 520, a second base portion of a second conductive pin may be surrounded with a second insulating sleeve having a wall thickness of between about 0.10 mm and about 0.30 mm, such as about 0.25 mm. Operations 510 and 520 may be performed in a variety of ways. For example, operations 510 and 510 may be simultaneously performed or may be performed in series. In some implementations, the insulating sleeves may be formed separate and independent from the conductive pins and installed onto the conductive pins (e.g., slid onto, wrapped around, etc.). In additional implementations, the insulating sleeves may be formed directly onto the conductive pins (e.g., on reduced-thickness base portions of the conductive pins), such as by insert molding, compression molding, thermoforming, etc. As explained above, in some examples, the insulating sleeves may be formed of a fiber-matrix composite material, such as a glass fiber and polymer matrix material. In one example, the insulating sleeves may be formed of a polyamide matrix material with a 30% weight value glass fiber reinforcement material.

At operation 530, the first conductive pin may be secured to a base structure by positioning a first insert portion of the first conductive pin within the base structure to an insert depth of at least 9.0 mm. At operation 540, the second conductive pin may be secured to the base structure by positioning a second insert portion of the second conductive pin within the base structure to an insert depth of at least 9.0 mm. Operations 530 and 540 may be performed in a variety of ways. For example, operations 530 and 540 may be simultaneously performed or may be performed in series. In some implementations, the base structure may be a plug housing attached to a conductive cable (e.g., as shown in FIG. 1) or the base structure may be a housing of an electrical device (e.g., as shown in FIG. 4). The base structure may include an insulating material, such as a polymer material. In some embodiments, the conductive pins may be secured to the base structure using an adhesive, a fastener (e.g., a screw, a bolt, a pin, etc.). In additional embodiments, the base structure may be formed on and around the insert portions of the conductive pins, such as by insert molding, compression molding, thermoforming, etc. In some examples, the insert portions of the conductive pins may include one or more features to secure the conductive pins to the base structure, such as one or more holes, one or more notches, surface roughness, etc.

Accordingly, the present disclosure includes electrical plugs, electrical devices, and methods that may employ insulated pins. Base portions of conductive pins may be surrounded by insulating sleeves with a small (e.g., less than about 0.30 mm) thickness to improve a mechanical strength of the base portions while still enabling a fit within a corresponding electrical outlet. In addition, the insulating sleeves may reduce a risk of electrical shock that might otherwise occur when the base portions of the conductive pins are touched.

The following example embodiments are also included in the present disclosure:

Example 1. An electrical plug, including: a base structure; a first conductive pin extending from the base structure, the first conductive pin including a first insert portion within the base structure, a first base portion, and a first exposed portion; a second conductive pin extending from the base structure, the second conductive pin including a second insert portion within the base structure, a second base portion, and a second exposed portion; a first insulating sleeve surrounding the first base portion of the first conductive pin; and a second insulating sleeve surrounding the second base portion of the second conductive pin, wherein each of the first insulating sleeve and the second insulating sleeve has a wall thickness between about 0.10 mm and about 0.30 mm.

Example 2. The electrical plug of Example 1, wherein each of the first insulating sleeve and the second insulating sleeve has a sleeve length along the respective conductive pin of about 5.0 mm or less.

Example 3. The electrical plug of Example 1 or Example 2, wherein each of the first insulating sleeve and the second insulating sleeve includes a support portion within the base structure.

Example 4. The electrical plug of any of Examples 1 through 3, wherein each of the first insert portion and the second insert portion has an insert length of at least about 9.0 mm.

Example 5. The electrical plug of any of Examples 1 through 4, wherein each of the first base portion and the second base portion has a base length of less than about 5.0 mm.

Example 6. The electrical plug of any of Examples 1 through 5, wherein each of the first base portion and the second base portion has a base thickness of at least about 1.20 mm.

Example 7. The electrical plug of Example 6, wherein the base thickness is about 1.30 mm.

Example 8. The electrical plug of any of Examples 1 through 7, wherein the wall thickness is about 0.25 mm.

Example 9. The electrical plug of any of Examples 1 through 8, wherein each of the first insulating sleeve and the second insulating sleeve is formed of a fiber-polymer composite material.

Example 10. The electrical plug of Example 9, wherein the fiber-polymer composite material includes a glass fiber material in a polymer matrix material.

Example 11. The electrical plug of Example 10, wherein the glass fiber material includes about 30% weight value of the fiber-polymer composite material.

Example 12. The electrical plug of Example 11, wherein the polymer matrix material includes a polyamide material.

Example 13. An electrical device, including: at least one electrically powered element; and an electrical plug for providing electrical power to the at least one electrically powered element, the electrical plug including: a base structure; a first conductive pin extending from the base structure, the first conductive pin including a first base portion and a first exposed portion; a second conductive pin extending from the base structure, the second conductive pin including a second base portion and a second exposed portion; a first insulating sleeve surrounding the first base portion of the first conductive pin; and a second insulating sleeve surrounding the second base portion of the second conductive pin, wherein: each of the first exposed portion and the second exposed portion has an exposed thickness of between about 1.40 mm and about 1.60 mm, each of the first base portion and the second base portion has a base thickness of at least about 1.20 mm and less than the exposed thickness, and each of the first insulating sleeve and the second insulating sleeve has a sleeve thickness of less than or equal to about 1.85 mm.

Example 14. The electrical device of Example 13, wherein: the first conductive pin further includes a first insert portion within the base structure; the second conductive pin further includes a second insert portion within the base structure; and each of the first insert portion and the second insert portion has an insert length of at least about 9.0 mm.

Example 15. The electrical device of Example 13 or Example 14, wherein the base structure includes a housing of the electrical device.

Example 16. The electrical device of any of Examples 13 through 15, wherein each of the first insulating sleeve and the second insulating sleeve is formed of a polymer and glass fiber composite material.

Example 17. The electrical device of Example 16, wherein the polymer and glass fiber composite material includes a polyamide material matrix and about 30% weight value of glass fiber material.

Example 18. The electrical device of any of Examples 13 through 17, wherein each of the first base portion and the second base portion has a base length of less than about 5.0 mm.

Example 19. A method of fabricating an electrical plug, the method including: surrounding a first base portion of a first conductive pin with a first insulating sleeve having a wall thickness of between about 0.10 mm and about 0.30 mm; surrounding a second base portion of a second conductive pin with a second insulating sleeve having a wall thickness of between about 0.10 mm and about 0.30 mm; securing the first conductive pin to a base structure by positioning a first insert portion of the first conductive pin within the base structure to an insert depth of at least about 9.0 mm; and securing the second conductive pin to the base structure by positioning a second insert portion of the first conductive pin within the base structure to an insert depth of at least about 9.0 mm.

Example 20. The method of Example 19, wherein the wall thickness of each of the first insulating sleeve and the second insulating sleeve is about 0.25 mm.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An electrical plug, comprising:

a base structure;

a first conductive pin extending from the base structure, the first conductive pin including a first insert portion within the base structure, a first base portion, and a first exposed portion;

a second conductive pin extending from the base structure, the second conductive pin including a second insert portion within the base structure, a second base portion, and a second exposed portion;

a first insulating sleeve surrounding the first base portion of the first conductive pin; and a second insulating sleeve surrounding the second base portion of the second conductive pin, wherein each of the first insulating sleeve and the second insulating sleeve has a wall thickness between about 0.10 mm and about 0.30 mm.

2. The electrical plug of claim 1, wherein each of the first insulating sleeve and the second insulating sleeve has a sleeve length along the respective conductive pin of about 5.0 mm or less.

3. The electrical plug of claim 1, wherein each of the first insulating sleeve and the second insulating sleeve includes a support portion within the base structure.

4. The electrical plug of claim 1, wherein each of the first insert portion and the second insert portion has an insert length of at least about 9.0 mm.

5. The electrical plug of claim 1, wherein each of the first base portion and the second base portion has a base length of less than about 5.0 mm.

6. The electrical plug of claim 1, wherein each of the first base portion and the second base portion has a base thickness of at least about 1.20 mm.

7. The electrical plug of claim 6, wherein the base thickness is about 1.30 mm.

8. The electrical plug of claim 1, wherein the wall thickness is about 0.25 mm.

9. The electrical plug of claim 1, wherein each of the first insulating sleeve and the second insulating sleeve is formed of a fiber-polymer composite material.

10. The electrical plug of claim 9, wherein the fiber-polymer composite material comprises a glass fiber material in a polymer matrix material.

11. The electrical plug of claim 10, wherein the glass fiber material comprises about 30% weight value of the fiber-polymer composite material.

12. The electrical plug of claim 11, wherein the polymer matrix material comprises a polyamide material.

13. An electrical device, comprising:

at least one electrically powered element; and an electrical plug for providing electrical power to the at least one electrically powered element, the electrical plug comprising:

a base structure;

a first conductive pin extending from the base structure, the first conductive pin including a first base portion and a first exposed portion;

a second conductive pin extending from the base structure, the second conductive pin including a second base portion and a second exposed portion;

a first insulating sleeve surrounding the first base portion of the first conductive pin; and a second insulating sleeve surrounding the second base portion of the second conductive pin, wherein:

each of the first exposed portion and the second exposed portion has an exposed thickness of between about 1.40 mm and about 1.60 mm, each of the first base portion and the second base portion has a base thickness of at least about 1.20 mm and less than the exposed thickness, and each of the first insulating sleeve and the second insulating sleeve has a sleeve thickness of less than or equal to about 1.85 mm.

14. The electrical device of claim 13, wherein:

the first conductive pin further comprises a first insert portion within the base structure;

the second conductive pin further comprises a second insert portion within the base structure; and each of the first insert portion and the second insert portion has an insert length of at least about 9.0 mm.

15. The electrical device of claim 13, wherein the base structure comprises a housing of the electrical device.

16. The electrical device of claim 13, wherein each of the first insulating sleeve and the second insulating sleeve is formed of a polymer and glass fiber composite material.

17. The electrical device of claim 16, wherein the polymer and glass fiber composite material comprises a polyamide material matrix and about 30% weight value of glass fiber material.

18. The electrical device of claim 13, wherein each of the first base portion and the second base portion has a base length of less than about 5.0 mm.

19. A method of fabricating an electrical plug, the method comprising:

surrounding a first base portion of a first conductive pin with a first insulating sleeve having a wall thickness of between about 0.10 mm and about 0.30 mm;

surrounding a second base portion of a second conductive pin with a second insulating sleeve having a wall thickness of between about 0.10 mm and about 0.30 mm;

securing the first conductive pin to a base structure by positioning a first insert portion of the first conductive pin within the base structure to an insert depth of at least about 9.0 mm; and securing the second conductive pin to the base structure by positioning a second insert portion of the first conductive pin within the base structure to an insert depth of at least about 9.0 mm.

20. The method of claim 19, wherein the wall thickness of each of the first insulating sleeve and the second insulating sleeve is about 0.25 mm.

* * * * *